US009564036B2

(12) United States Patent
Striemer et al.

(10) Patent No.: US 9,564,036 B2
(45) Date of Patent: Feb. 7, 2017

(54) SYSTEM AND METHOD TO DETECT THE PRESENCE OF A CHILD IN A CAR SEAT

(71) Applicants: Grant Edward Anders Striemer, Fairfield Township, OH (US); Maria Michelle Striemer, Fairfield Township, OH (US)

(72) Inventors: Grant Edward Anders Striemer, Fairfield Township, OH (US); Maria Michelle Striemer, Fairfield Township, OH (US)

( * ) Notice: Subject to any disclaimer, the term of this patent is extended or adjusted under 35 U.S.C. 154(b) by 0 days.

(21) Appl. No.: 14/523,904

(22) Filed: Oct. 26, 2014

(65) Prior Publication Data
US 2016/0117903 A1    Apr. 28, 2016

(51) Int. Cl.
*G08B 23/00*    (2006.01)
*G08B 21/02*    (2006.01)
*H04W 4/00*    (2009.01)
*H04L 12/26*    (2006.01)

(52) U.S. Cl.
CPC ....... *G08B 21/0205* (2013.01); *H04L 43/0811* (2013.01); *H04L 43/14* (2013.01); *H04W 4/008* (2013.01)

(58) Field of Classification Search
CPC ..... B60R 21/01556; B60N 2/002; B60N 2/26; G08B 21/22; G08B 21/02; G08B 21/0202; G08B 21/0205; G08B 25/016; H04W 4/008; H04L 43/0811; H04L 43/14
USPC .............................. 340/573.4, 539.13, 691.6
See application file for complete search history.

(56) References Cited

U.S. PATENT DOCUMENTS

| | | | |
|---|---|---|---|
| 7,009,522 B2 | 3/2006 | Flanagan | |
| 7,466,217 B1 | 12/2008 | Johnson | |
| 7,592,905 B2 | 9/2009 | Barton | |
| 7,796,021 B2 * | 9/2010 | Saban | B60N 2/002 340/573.4 |
| 8,212,665 B2 | 7/2012 | Schoenberg | |
| 8,477,024 B2 | 7/2013 | Schoenberg | |
| 8,570,168 B2 | 10/2013 | Logan | |
| 8,768,292 B2 | 7/2014 | Welch | |
| 8,816,845 B2 | 8/2014 | Hoover | |
| 2007/0018812 A1 * | 1/2007 | Allen et al. | G08B 21/0202 340/539.13 |
| 2007/0268119 A1 | 11/2007 | Cram | |
| 2008/0073141 A1 | 3/2008 | Jaunarena-Ferrari | |
| 2010/0253504 A1 * | 10/2010 | Lliteras et al. | G08B 21/22 340/573.4 |
| 2011/0109450 A1 | 5/2011 | Hirschfeld | |

(Continued)

*Primary Examiner* — Thomas Mullen (57) ABSTRACT

A system and method that detects a presence of a child in a car seat comprises a pad and a receiver. The pad comprises a communication element, a unique identifier, a power source, a switch configured to adapt a power state from "off" to "on" by means of a child closing the switch disposed between the pad's power source and the pad's communication element. The receiver comprises an analysis element storing the unique identifier of at least one pad and a communication element in communication with at least one pad when the pad is powered "on". The receiver determines a presence state of a child in the car seat when the receiver is in communication with the powered pad. The receiver determines the presence state when the receiver loses communication with the pad. The receiver further generates notifications with the determined child's presence state in the car seat.

4 Claims, 6 Drawing Sheets

(56) References Cited

U.S. PATENT DOCUMENTS

| | | |
|---|---|---|
| 2012/0232749 A1 | 9/2012 | Schoenberg |
| 2012/0268265 A1 | 10/2012 | Morley |
| 2013/0049946 A1 | 2/2013 | Chavez |
| 2013/0194089 A1 | 8/2013 | Estrada |
| 2013/0201013 A1* | 8/2013 | Schoenberg ............ B60R 22/48 340/438 |
| 2014/0085070 A1 | 3/2014 | Schoenberg |

* cited by examiner

SYSTEM AND METHOD TO DETECT THE PRESENCE OF A CHILD IN A CAR SEAT

FIELD OF THE INVENTION

The invention relates to a system and method for determining the presence of an object on a pre-determined location through the use of BLUETOOTH® Low Energy, universal unique identifier presence, and range information.

BACKGROUND OF THE INVENTION

Every year, children are left in a car by their caregiver, causing injury and in some cases, death. "Mind on a daily task" is a reason for a caregiver unintentionally leaving a child alone in the car. This detrimental problem could be resolved by an invention that assists a caregiver without changing their daily routine while providing peace-of-mind that they will be reminded if they accidentally forget their child in the car. Consumer expectations for interactive, smart devices are growing every year. Devices of the past relied on being serviced and checked by the user.

DISCUSSION OF THE RELATED ART

BLUETOOTH® Low Energy (BLUETOOTH® 4.0) or ("BLE"), specifically APPLE® IBEAECON™, has opened the door to alert systems that require little energy to communicate resulting in years of battery life.

SUMMARY OF THE INVENTION

This invention addresses the disadvantages cited in prior art, in terms of seamlessly fitting into a caregiver's routine improving the use experience, simplification of necessary components, improved power management, and improvements to the user experience. In one aspect, a presence indicator comprises a pad and a receiver. The pad comprises at least one communication element with a universally unique identifier. The pad further comprises a power source and a switching element between the power source and the communication element. The receiver comprises an analysis element storing the unique identifier of at least one pad, a communication element in communication with at least one pad when the pad is powered "on". When a child is on the pad, the switching element is closed between the power source and the communication element, powering the pad thus initiating communication between the pad and receiver. The receiver is further able to determine the furthest distance over which the most recent communication was successful. No power is used when the child is not present, therefore extending the life of the battery.

In another aspect, a method for determining a presence state of a child comprising: a seat containing a pad, a means by which a child's mass closes a power switch disposed between a communication element and a power source powering the pad to broadcast a unique identifier; a receiver containing an analysis element storing the unique identifier of the pad, with the analysis element matching the stored unique identifier of the unique identifier broadcasted by the powered pad; the receiver determining the furthest distance over which the most recent communication was successful; a receiver providing a notification associated with an interpreted communication state of the receiver and the pad.

OBJECTS AND ADVANTAGES

Accordingly, several objects and advantages of the system are

No need for traditional sensors that require power to indicate the presence of a child. A mechanical switch is closed between the power source and communication element with the child's presence on the pad;

No sensors reduce complexity, software/memory bandwidth and cost of design;

Battery life is further conserved due to only being used with the child activates the switch while in the car seat;

No need for the caregiver to activate the system each time when the child is in the seat (the receiver recognizes this via communication with the pad);

The IBEACON™ protocol allows for several systems if desired due to the non-pairing nature of IBEACON™ compared to conventional BLUETOOTH® protocol;

Notifications are sent based on scenarios of lost signal and last distance reading to reduce unnecessary information being provided to the caregiver;

The caregiver can tailor the level of interaction with the receiver;

Further objects and advantages of the invention will become apparent from a consideration of the drawings and ensuing description.

BRIEF DESCRIPTION OF THE DRAWINGS

Further features of the drawings and features will be readily apparent through consideration of the drawings.

DETAILED DESCRIPTION OF THE INVENTION

Figure 1:
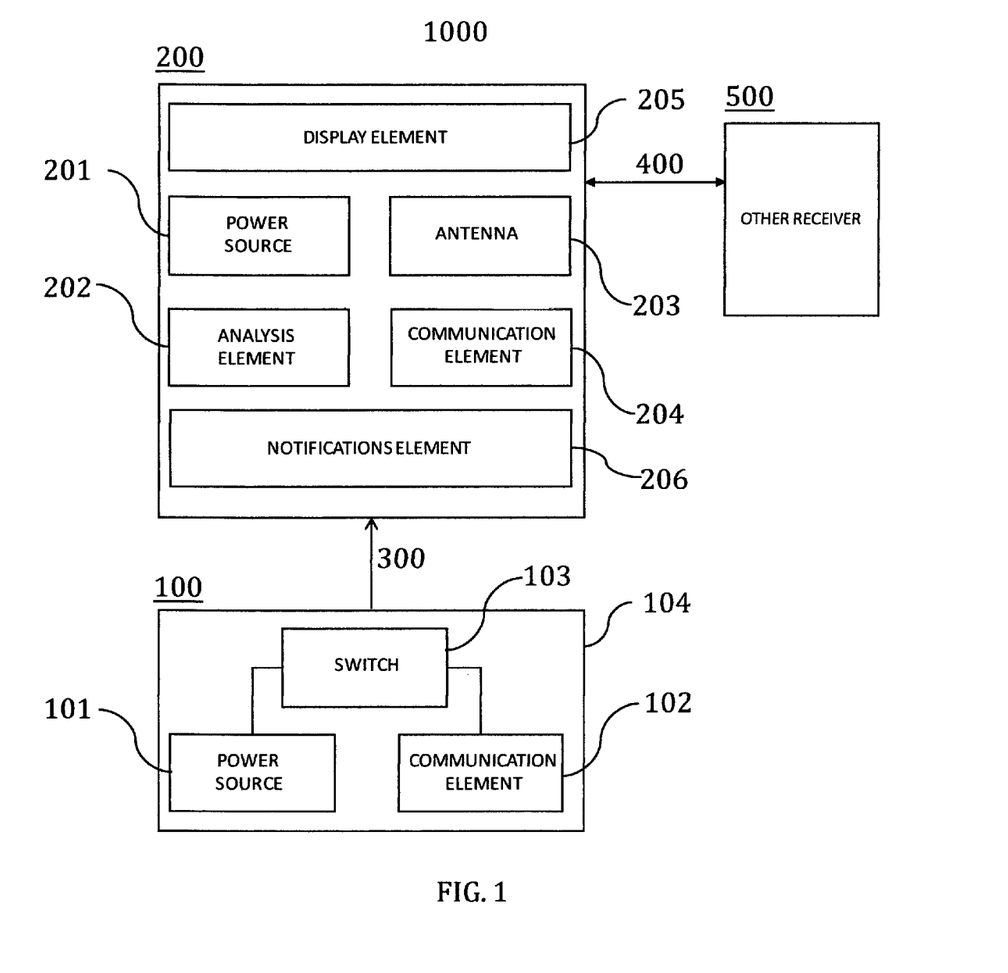
FIG. 1 shows a schematic of the system.

As shown in FIG. 1, a system 1000 comprises a pad 100 and a receiver 200. The pad 100 comprises a power source 101, a communication element 102, a switch 103, and an enclosure 104. The receiver 200 comprises a power source 201, an antenna 202, an analysis element 203, and communication element 204, a display element 205, and a notifications element 206. The receiver 200 and pad 100 communicate via a wireless communication protocol 300.

The Pad

Figure 2:
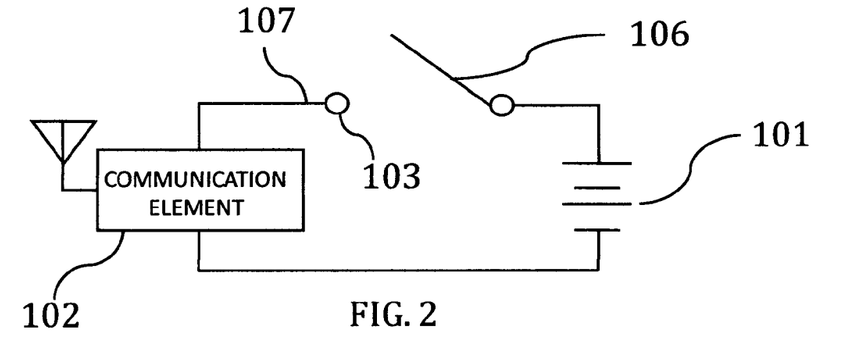
FIG. 2 shows a schematic of the switch in an open state (power off)
Figure 3:
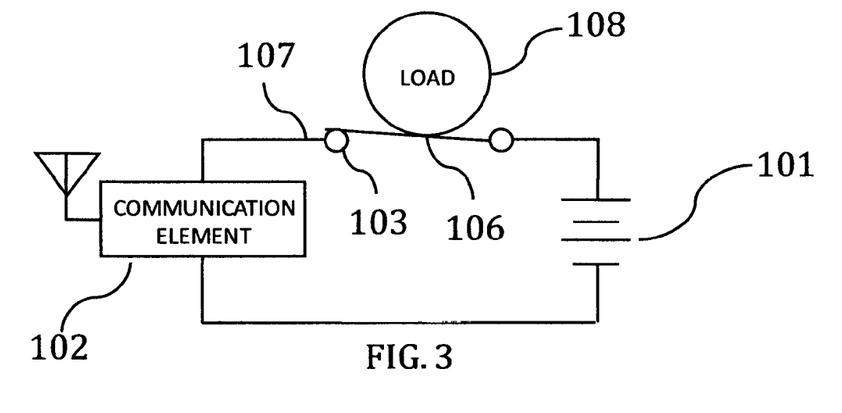
FIG. 3 shows a schematic of the switch in a closed state (power on)

In one aspect the system 1000 comprises a pad 100. The pad 100 contains a power source 101. An exemplary power source is a PANASONIC® CR 2032 3-volt lithium coin cell battery. However, the power source may be rechargeable or disposable. The pad 100 also contains a communication element 102. An exemplary communication element 102 is the LIGHTBLUE™ Bean IBECAON® by Punch Through Design, LLC, in San Francisco, Calif. The LIGHTBLUE™ contains an LBM313 chip and antenna designed for BLUETOOTH® Low Energy (BLE) communication. However, any communication protocol with unique identifier(s) and ranging abilities may be used. The pad 100 also contains a switch 103 between the power source 101 and the communication element 102. The switch 103 can be tactile, rocker, DIP, thumbwheel, pushbutton, toggle, slide, and cantilever. The switch 103 turns the power 101 to the communication element 102 on or off. As shown in FIG. 2, an exemplary switch 103 is a metal cantilever switch 106 and a landing pad 107 that do not make contact in an open circuit configuration in which the communication element 102 receives no power from the power source 101. As shown in FIG. 3, when a load 108 from a child 600 is placed on the cantilever switch 106, it makes contact with the landing pad 107 closing the circuit between the power source 101 and communication element 102.

The following embodiment describes how the switch 103 is made. The CR2032 coin cell holder is removed from the LIGHTBLUE™ Bean. Wires replace the previous electrical connections of the coin cell holder. One of the wires includes a switch 103 to act as the presence indicator and conserve battery life when no there is no object presence. The modified LIGHTBLUE™ Bean IBECAON®, coin cell battery, wires and switching mechanism is housed in an enclosure 104. The exemplary enclosure is molded silicone with a top and bottom that fit together by the top having ridges that overlap the bottom. The enclosure can be made of any material that protects the electronics while allows the presence of an object to close a switch inside the enclosure. The electronics inside are positioned such that the switch is in contact with the enclosure. The diameter of the enclosure is 80 mm in diameter and 10 mm in thickness.

The Receiver

In another aspect, the system 1000 in FIG. 1, comprises a receiver 200, a power source 201, an antenna 202, an analysis element 203, a communication element 204, a display element 205, and a notifications element 206. Exemplary receivers with IBECAON® capabilities are IPHONE® 4s or later, IPAD® ($3^{rd}$ generation) or later, IPAD MINI™ or later, or IPOD TOUCH® ($5^{th}$ generation) or later. Future devices may become available that can support IBECAON® capabilities such as dongles, computers, personal display assistants (PDA), and other mobile phone platforms. Dongles can be communication devices that only serve an application specific purpose and may not have a display. Exemplary receiver communication elements 204 may include but are not limited to cellular, WIFI™, IBECAON®, Near Field Communication (NFC), ZIGBEE®, or 6LoWPAN. The communication protocol 300 between the pad 100 and the receiver 200 is BLUETOOTH® 4.0 with APPLE® IBEACON™ protocol to alert nearby IOS© devices of the communication element's 102 presence with a universally unique identifier (UUID). The protocol also allows for proximity (range) determination between the receiver 200 and communication element 102 in the pad 100. The notification element 206 includes hardware features available in the phone for notifications such as haptic, light, and/or auditory.

Pad Placement with Respect to the Car Seat

Figure 4:
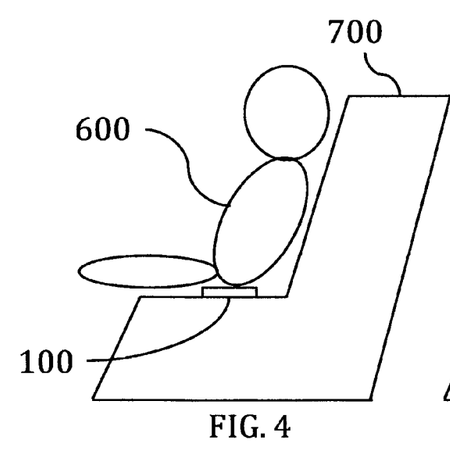
FIG. 4 shows a side view of the pad on a child seat and a child on the pad.
Figure 5:
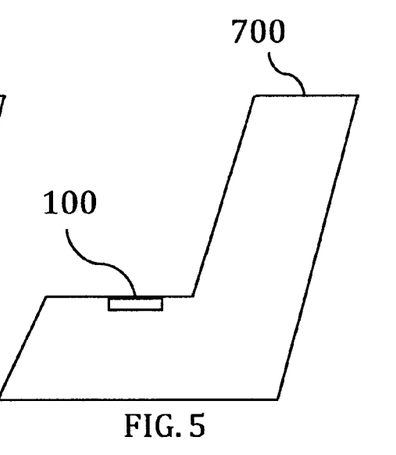
FIG. 5 shows a side view of the pad placement in the seat.
Figure 6:
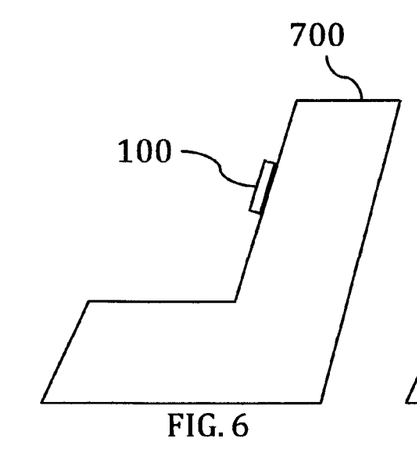
FIG. 6 shows a side view of the pad placement on the headrest of the seat.
Figure 7:
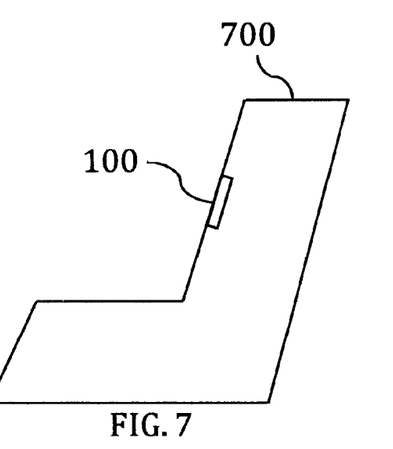
FIG. 7 shows a side view of the pad placement in the headrest of the seat.

As shown in FIG. 4, a preferred embodiment of a child 600 activating the pad 100, is the pad 100 disposed directly on the car seat 700 with the child 600 sitting on the pad 100 and car seat 700. Alternatively, in FIG. 5, the pad 100 could be placed in the child car seat 700. An example of being placed within the car seat 700 could be under the car seat fabric if accessible. Alternatively, in FIG. 6, the pad 100 can be placed on the car seat 400 headrest. Alternatively, in FIG. 7, the pad 100 could be placed in the headrest. An example of within the car seat 700 headrest could be under the fabric of the child car seat 700. It is understood that the pad 100 could be placed on or within a conventional car seat 700.

Software for Receiver

The software may be written for a receiver 200 to acknowledge the presence of a powered pad 100 via IBECAON™ protocol. The software on the receiver 200 is stored and executed in the analysis element 203 that further stores the UUID of the pad 100 and enables the receiver 200 to automatically detect the powered pad 100 broadcasting the UUID to seamlessly identify the child 600 in the car seat 700 without active intervention by the caregiver. The software is further able to determine the range between the pad 100 and the receiver 200. An exemplarily analysis element 203 is the memory and processor of a BLUETOOTH® BLE compatible IOS© device. The exemplary software program allows the caregiver to customize their experience with the system 1000. The exemplary software application for the receiver 200 is designed using APPLE® XCODE®. The software communication 300 between the pad 100 and receiver 200 is illustrated as three exemplarily notifications.

Figure 8:
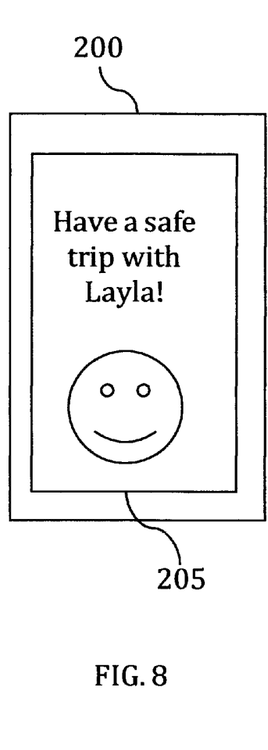
FIG. 8 is a view of the receiver with a reminder notification message.

In FIG. 8, the receiver 200 detects the UUID of the pad 100. The software compares the detected UUID with the pad's 100 stored UUID in the analysis element 203. If the UUID does not match the stored UUID, no action is taken. If the detected UUID matches the stored UUID, the software interprets this as the child 600 activating the pad 100 by sitting in the car seat 700. The software interpretation of the pad 100 activation further results in a notification from the receiver 200. Future variations of IOS® hardware and firmware may allow for range information to be available in the background. In a scenario where the software is running in the foreground (or future case in the background) and the last known communication 300 range was less than intermediate (few meters) between the pad 100 and receiver 200, a notification on the receiver 100 alerts the caregiver that the child 600 was placed in the seat 700. The caregiver can make this message optional.

Figure 9:
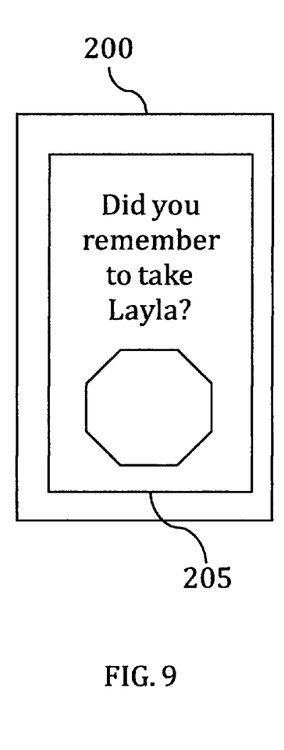
FIG. 9 is a view of the receiver with a reminder notification message.

As shown in FIG. 9, the least level of caregiver interaction with the system 1000 is a notification on the receiver 200 indicating the child 600 may have been left in the car seat 700; determined by the software as a loss of communication 300 between the receiver 200 and pad 100. In a scenario where the software is running in the foreground (or future case in the background) and the last known communication 300 range was far (greater than 10 meters) between the pad 100 and receiver 200, a notification on the receiver 100 alerts the caregiver they may have left the child 600 in the car un-attended.

Figure 10:
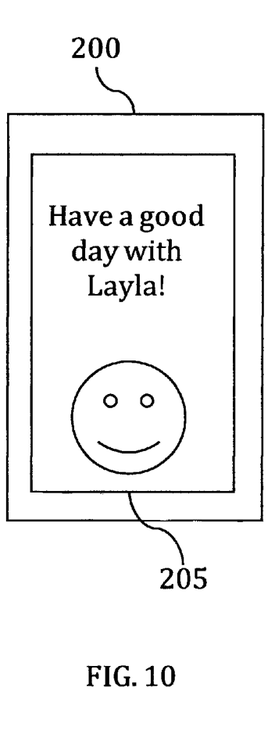
FIG. 10 is a view of the receiver with a reminder notification message.

As shown in FIG. 10, if the software acknowledges the loss of communication between the pad 100 and receiver 200 in combination with a range less than intermediate (few meters), a positive notification is presented on the receiver 200 to confirm that the child 600 was removed from the car can be provided to the receiver 200. This notification can be turned off, disabled, etc. by the caregiver. The application can further be customized with the child's 600 name. It is understood that the notification may be a visual, haptic, or auditory. The software on the primary receiver can send notifications to other pre-determined receivers with the software. For example, the system 1000 may indicate that the child 600 was left in a seat 700, but the driving caregiver's phone is not noticed. Another predetermined caregiver can receive a notification indicating the child 600 is still in the seat 700 and GPS location.

The software further allows the caregiver to interact with the receiver 200 to check the current status of the pad 100, GPS location, purchase items via e-commerce, change notification messages, and add other pads 100.

Initial Setup

The caregiver can add any additional phones to alert if the child 600 is left in a seat 700, access to hardware peripherals, etc. The user will be asked to open the pad 100 to remove the protective tab to initialize the battery use. The user will then place an object on the pad 100 to active the IBEACON™ signal. The software on the receiver 200 will guide the caregiver through an association process to identify that UUID with their system 1000 only. Once paired, the pad 100 is placed on the car seat 700 for use.

Use Scenario Embodiment 1 (Range Available)

Figure 11:
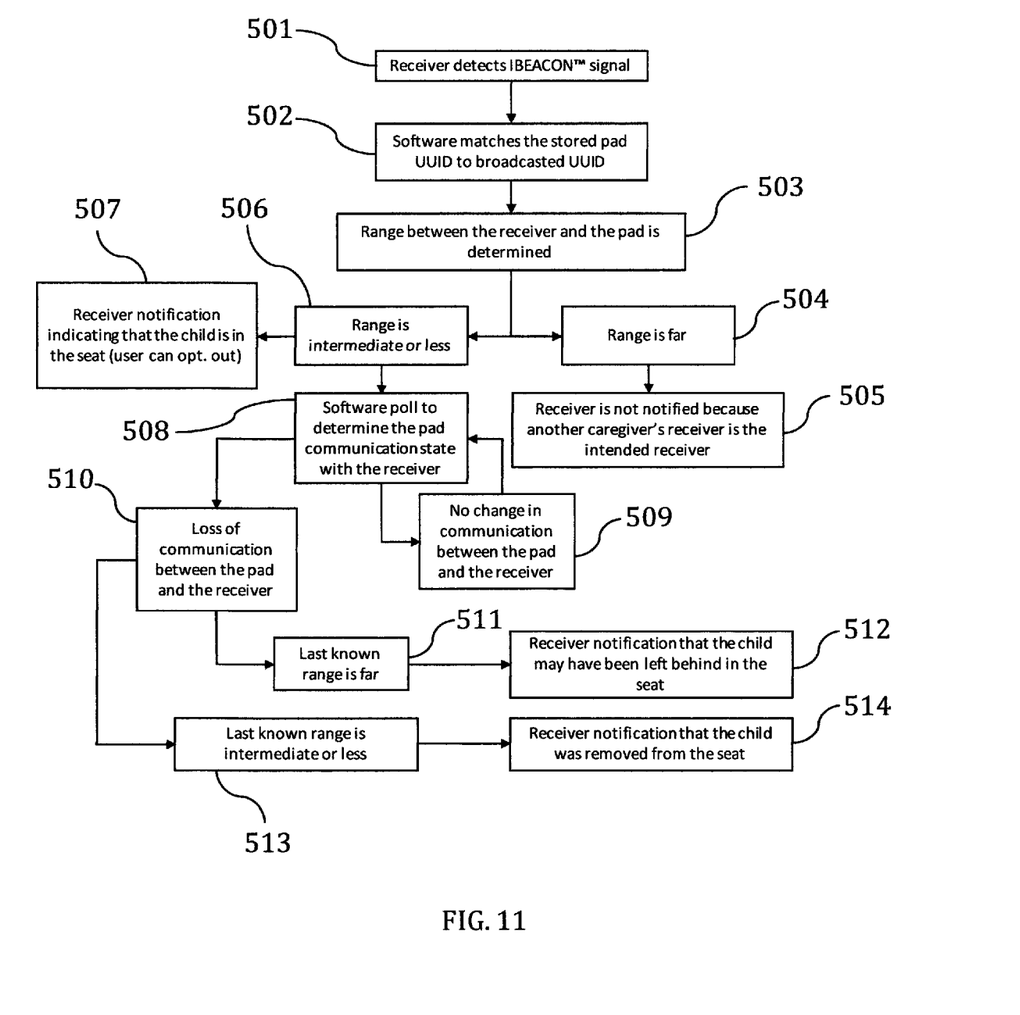
FIG. 11 is a flow diagram of the system user scenario embodiment (range available)

An exemplary system 1000 use scenario is illustrated in FIG. 11. The presence state is interpreted by the software and analysis element 203 in terms of the communication 300 state and range between the receiver 200 and pad 100. The presence states described consist of: the child 600 is placed in the car seat 700 (communication 300 exists and range is intermediate or less), the child 600 is sitting in the car seat 700 (continued communication 300 exists and range is intermediate or less), and the child 600 is left in the car seat 700 (communication 300 ceases and last known range is far), and the child 600 is removed from the car seat 700 (communication 300 ceases and last known range is intermediate or less).

Pad Detected by the Receiver (Child Placed in the Car Seat)

When the child 600 is placed in the car seat 700 on the pad 100, the load 108 from the child 600 closes the switch 103 providing power 101 to the communication element 102 in the pad 100. The receiver 200 detects an IBEACON™ signal 300 from the pad 100 (FIG. 11. 501) whereby the software on the receiver 200 matches the stored pad 100 UUID to the pad 100 UUID stored in analysis element 203 (FIG. 11. 502). The software and analysis element 203 further determine the range between the powered pad 100 and the receiver 200 (FIG. 11. 503). The software can be configured such that, if the range between the pad 100 and the receiver 200 is intermediate or less (FIG. 11. 505), a notification (FIG. 9) is provided on the receiver 200 (FIG. 11. 507). The caregiver can choose to disable a seating confirmation message (FIG. 9). The software can be configured such that, if the range between the pad 100 and receiver 200 is far (FIG. 11. 504), the software will not provide a notification because the receiver is not the receiver 200 of the caregiver driving the child 600 (FIG. 11. 505). A further explanation of FIG. 11, step 505 would be two caregivers sharing the same system 1000 consisting of a pad 100 and two receivers 200. If one caregiver was driving the child 600 out of the garage and the other caregiver remained home, this would eliminate unnecessary notifications to the caregiver remaining home as the car leaves. The software and analysis element 203 continue to poll the communication state and range between the pad 100 and receiver 100 (FIG. 11. 508). While the pad 100 and receiver 200 are in communication, the communication state is the child 600 is near the caregiver (child 600 is sitting in the car seat 700) and no further action is needed (FIG. 11. 509).

Pad No Longer Detected by the Receiver (Child Left in Car Seat After the Caregiver Leaves the Car)

While in the car, the caregiver's receiver 200 is in communication 300 with the pad 100. If the caregiver leaves the car and forgets to remove the child 600, the communication 300 will eventually cease due to the range between the receiver 200 and pad 100 exceeding a far distance (FIG. 11. 510). The software logic pairs the last known range being a far range and communication 300 loss to a child 600 being left in the car seat 700 by the caregiver. The software provides a notification (FIG. 8) to the caregiver that the child 600 is still in the car. In a case where only one receiver 200 is in communication 300 with the pad 100 before communication 300 ceases, and the caregiver did not acknowledge the notification by turning it off, a secondary notification is sent to another registered receiver 200 as a backup. The secondary notification can include GPS coordinates to where the car is located. An exemplary instance is the primary receiver 200 is in a state where the notification is not heard, seen or felt in a coat, handbag, etc. The secondary notification is a fail-safe that another caregiver could act upon. In a case where two receivers 200 are in communication with a pad 100 (both caregivers in the car at the same time), a child 600 is assumed to be safe as long as one receiver 200 is in communication with the pad 100. In the two-receiver 200 case, if one receiver 200 loses communication 300 with the pad 100, the software will check over the network link 400 to see if the other receiver 200 is on communication with the pad 100. If one receiver 200 is in communication 300 and the other is not, no notification is sent. If both receivers 200 lose communication 300 and the last known ranges were intermediate or less, a notification (FIG. 9) is sent to both receivers 200.

Pad No Longer Detected by the Receiver (Child Removed from Car Seat)

If the caregiver removes the child 600 from the car seat 700, the load 108 opens the switch 103 between the power 101 and the communication element 103 in the pad 100, whereby the pad 100 is powered down and no longer in communication 300 with the receiver 200 (FIG. 11. 510). The software and analysis element 203 determine the last known range between the pad 100 and receiver 200 is intermediate or less. The software logic pairs the last known range being a close range and communication 300 loss to a child 600 being removed from the seat 700 by the caregiver. The software provides a notification (FIG. 10) to the caregiver. A caregiver may decide a confirmation notification may be unnecessary and disable this message in the software settings menu.

Use Scenario Embodiment 2 (Range Not Available)

Figure 12:
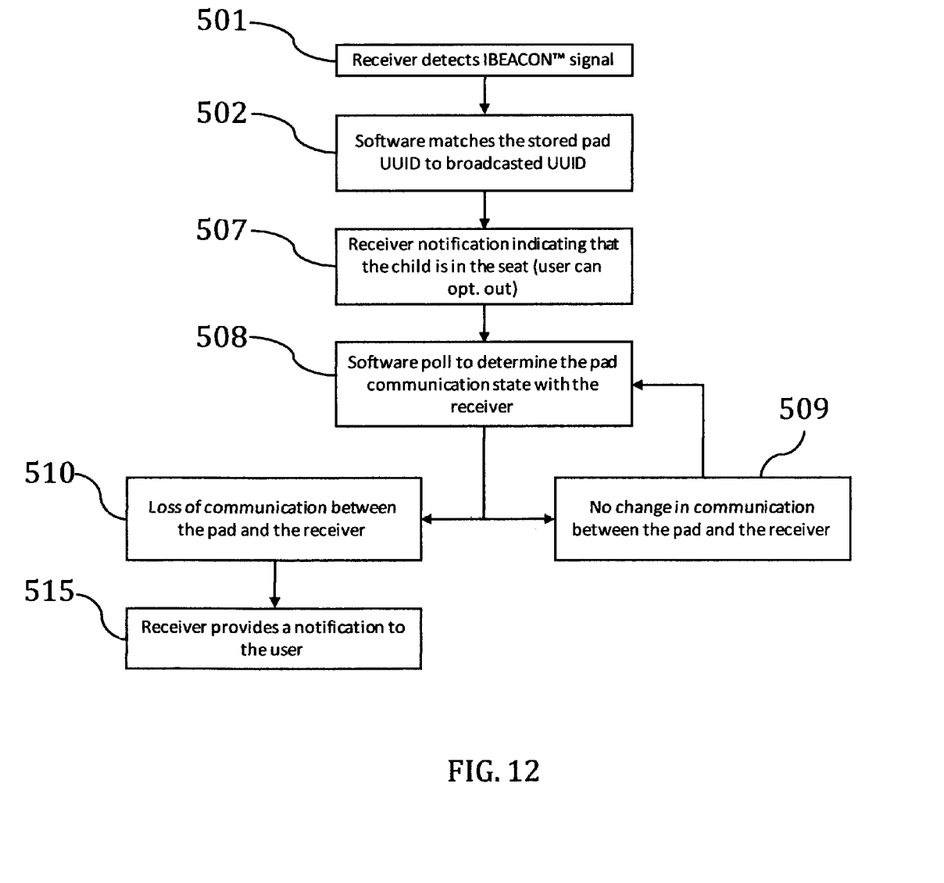
FIG. 12 is a flow diagram of the system user scenario embodiment (range not available).

An exemplary system 1000 use scenario is illustrated in FIG. 12. The presence state is interpreted by the software and analysis element 203 in terms of the communication 300 state between the receiver 200 and pad 100. The presence states described consist of: the child 600 is placed in the car seat 700 (communication 300 exists), the child is sitting in the car seat 700 (communication 300 exists), and a reminder notification sent when communication is lost between the pad 100 and receiver 200 (communication 300 ceases).

Pad Detected by the Receiver (Child Placed in the Car Seat)

When the child 600 is placed in the car seat 700 on the pad 100, the load 108 from the child 600 closes the switch 103 providing power 101 to the communication element 102 in the pad 100. The receiver 200 detects an IBEACON™ signal 300 from the pad 100 (FIG. 11. 501) whereby the software on the receiver 200 matches the stored pad 100 UUID to the pad 100 UUID stored in analysis element 203 (FIG. 12.

502). Upon successful matching, the software and analysis element 203 continue to poll the communication 300 state and range between the pad 100 and receiver 100 (FIG. 12. 508). While the pad 100 and receiver 200 are in communication, the communication 300 state is that the child 600 is near the caregiver and no further action is needed (FIG. 12. 509).

Pad No Longer Detected by the Receiver (Child Left in Car Seat After the Caregiver Leaves the Car)

While in the car, the caregiver's receiver 200 is in communication with the pad 100. If the caregiver leaves the car and forgets to remove the child 600, the communication 300 will eventually cease due to the range between the receiver 200 and pad 100 exceeding a far distance (FIG. 12. 510). After loss of communication 300, the software provides a notification to the caregiver that the child 600 may still in the car. Because range notification information is not available, the caregiver can chose choose a custom message or choose from one of: FIG. 8, FIG. 9, and FIG. 10. In a case where only one receiver 200 is in communication 300 with the pad 100 before communication 300 loss, and the caregiver did not acknowledge the notification by turning it off, a secondary notification is sent to another registered receiver 200 as a backup. The secondary notification can include GPS coordinates to where the car is located. An exemplary instance is the primary receiver 200 is in a state where the notification is not heard, seen or felt in a coat, handbag, etc. The secondary notification is a fail-safe that another caregiver could act upon. In a case where two receivers 200 are in communication 300 with a pad 100 (both caregivers in the car at the same time), a child 600 is assumed to be safe as long as one receiver 200 is in communication 300 with the pad 100. In the two-receiver 200 case, if one receiver 200 loses communication 300 with the pad 100, the software will check over the network link 400 to see if the other receiver 200 is on communication with the pad 100. If one receiver 200 is in communication 300 and the other is not, no notification is sent. If both receivers 200 lose communication 300 the caregivers receive a pre-determined notification or one of: FIG. 8, FIG. 9, and FIG. 10.

Pad No Longer Detected by the Receiver (Child Removed From Car Seat)

If the caregiver removes the child 600 from the car seat 700 the load 108 opens the switch 103 between the power 101 and the communication element 103 in the pad 100, whereby the pad 100 is powered down and no longer in communication 300 with the receiver 200 (FIG. 12. 510). The software in the receiver 200 interprets the loss of communication 300 as the child 600 being removed from the car seat 700 resulting in a said notification being sent to the caregivers (FIG. 12. 515).

CONCLUSION, RAMIFICATIONS, AND SCOPE

Accordingly, the reader will see that the presence indicator for a car seat 700 using BLUETOOTH® BLE communication and the minimalistic nature of using a switch as a pseudo-sensor has advantages in that there is no need to add additional cost in conventional sensors to determine presence;
reducing the need for conventional sensors reduces power consumption;
reducing processing needs of a microcontroller to handle collection and interpretation of sensor data;
battery life only being used when the system is activated;
methods described to prevent un-wanted notifications;
a system that allows a caregiver to tailor notifications to meet their daily routine while keeping their child safe.

Although the description above contains many specifications, these should not be construed as limiting the scope of the invention by as merely providing illustrations of some of the presently preferred embodiments. For example, the enclosure may constructed of any material in any desired shape; the dimensions of the pad are provided as exemplary only and may be of any consumer preferred or use optimized dimension; the switch may be; [[tactile, rocker, DIP, thumbwheel, toggle, pushbutton, slide, and cantilever]]; the BLUETOOTH® element can be any that support the IBEACON® protocol; a microcontroller can be used in combination with the BLUETOOTH® radio; the application can be written in any IOS® interpretable language, etc.

Thus the scope of the invention should be determined by the appended claims and their legal equivalents, rather than by the examples given.

What is claimed is:

1. A system that detects the presence of a child in a car seat, the system comprising:
   a. a pad comprising a communication element, a universally unique identifier associated with the pad, a power source, and a switch configured to adapt the communication element's power state from "off" to "on" wherein the force generated by the child's mass when in contact with the switch closes the switch disposed between the pad's power source and the pad's communication element;
   b. a receiver comprising an analysis element storing the unique identifier of the pad and a communication element in communication with the pad when the pad's communication element is powered "on";
whereby the receiver determines a presence state of the child based on whether the switch is open or closed when the receiver is in communication with the pad; and the receiver further determines the presence state of the child in the car seat when the receiver loses communication with the pad.

2. The system of claim 1 wherein the switch is selected from the group consisting of: tactile, rocker, DIP, thumbwheel, pushbutton, toggle, slide, and cantilever.

3. The system of claim 1 wherein the communication between the pad's communication element and the receiver's communication element is the BLUETOOTH® 4.0, APPLE® IBEACON™ protocol.

4. The system of claim 1 wherein the receiver is selected from the group consisting of: IPHONE® 4s or later, IPAD® ($3^{rd}$ generation) or later, IPAD MINI™ ($1^{st}$ generation or later), or IPOD TOUCH® ($5^{th}$ generation) or later.

* * * * *